US012744805B2

(12) United States Patent
Ramjee

(10) Patent No.: US 12,744,805 B2
(45) Date of Patent: Sep. 22, 2026

(54) SYSTEMS AND METHODS FOR MONITORING NETWORK TRAFFIC TO IDENTIFY CYBERATTACKS

(71) Applicant: Stripe, LLC, South San Francisco, CA (US)

(72) Inventor: Sharan Ramjee, South San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 23 days.

(21) Appl. No.: 18/679,356

(22) Filed: May 30, 2024

(65) Prior Publication Data

US 2025/0373638 A1 Dec. 4, 2025

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ........................ H04L 63/1425; H04L 63/1416
See application file for complete search history.

(56) References Cited

U.S. PATENT DOCUMENTS

| | | | | |
|---|---|---|---|---|
| 12,155,742 | B1 * | 11/2024 | Zafar | H04J 3/0661 |
| 12,289,323 | B1 * | 4/2025 | Holub | G06N 20/00 |
| 2018/0367550 | A1 * | 12/2018 | Musuvathi | H04L 63/1425 |
| 2023/0098508 | A1 * | 3/2023 | Mishra | H04L 63/1458 726/23 |

* cited by examiner

*Primary Examiner* — Anh Nguyen
(74) *Attorney, Agent, or Firm* — Foley & Lardner LLP

(57) ABSTRACT

Disclosed herein are systems and methods for monitoring network traffic to identify cyberattacks. An example method includes obtaining a first plurality of data packets transmitted over a network during at least one period of time; determining a plurality of feature values based on the plurality of data packets, each feature corresponding to execution of a protocol by the first system; generating an embedding based on the plurality of feature values and an encoder, the encoder configured to generate embeddings based on pluralities of feature values, the embeddings corresponding to a period of time; and determining that at least one data packet of the plurality of data packets is involved in a cyberattack based on the embedding. The method can include causing an execution of a remedial protocol in association with the first system.

17 Claims, 5 Drawing Sheets

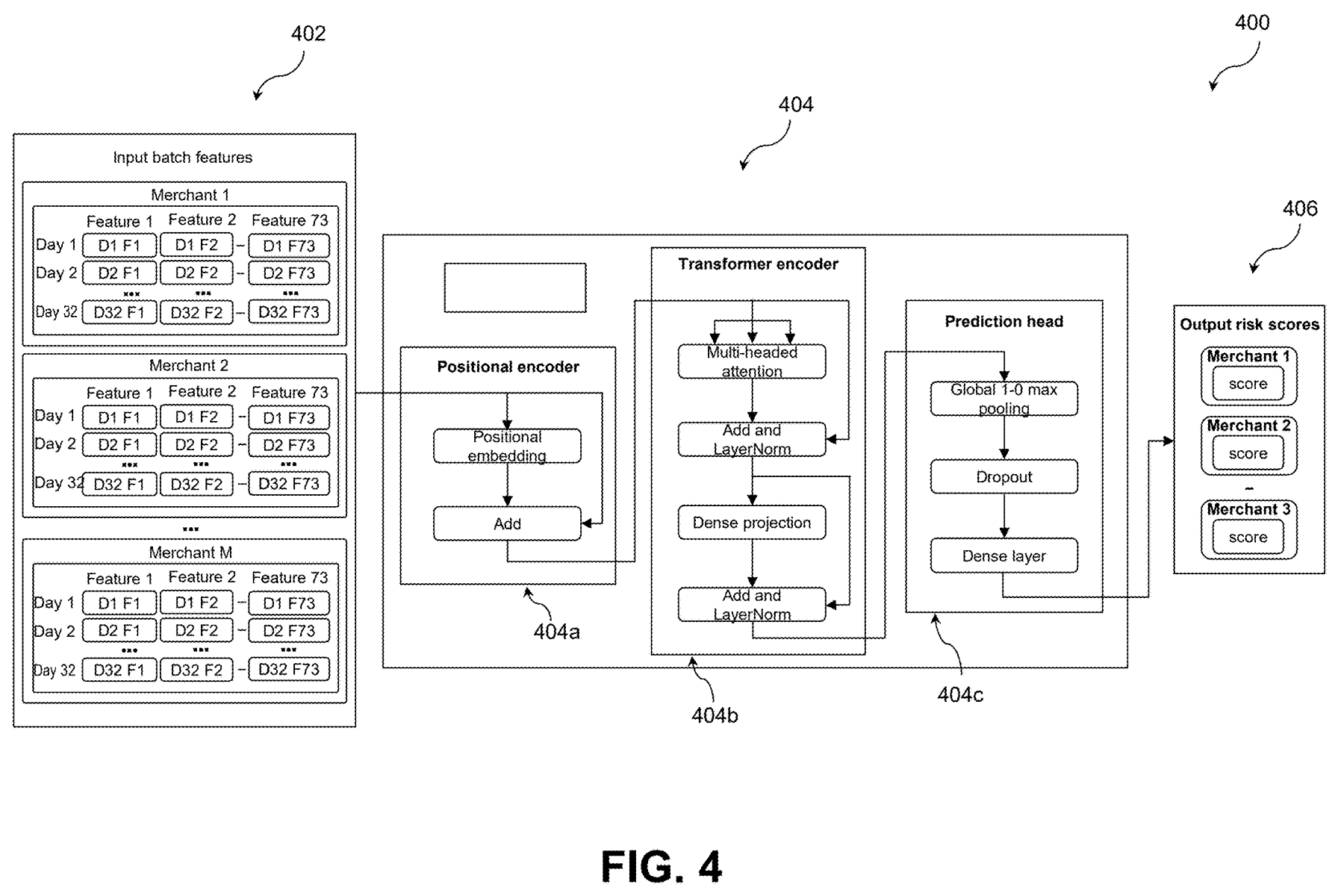

400

402

Input batch features

Merchant 1
Feature 1 Feature 2 Feature 73
Day 1 D1 F1 D1 F2 D1 F73
Day 2 D2 F1 D2 F2 D2 F73
Day 32 D32 F1 D32 F2 D32 F73

Merchant 2
Feature 1 Feature 2 Feature 73
Day 1 D1 F1 D1 F2 D1 F73
Day 2 D2 F1 D2 F2 D2 F73
Day 32 D32 F1 D32 F2 D32 F73

Merchant M
Feature 1 Feature 2 Feature 73
Day 1 D1 F1 D1 F2 D1 F73
Day 2 D2 F1 D2 F2 D2 F73
Day 32 D32 F1 D32 F2 D32 F73

404

404a
Positional encoder
Positional embedding
Add

404b
Transformer encoder
Multi-headed attention
Add and LayerNorm
Dense projection
Add and LayerNorm 404c
Prediction head
Global 1-0 max pooling
Dropout
Dense layer 406
Output risk scores
Merchant 1 score
Merchant 2 score
Merchant 3 score

FIG. 4

SYSTEMS AND METHODS FOR MONITORING NETWORK TRAFFIC TO IDENTIFY CYBERATTACKS

TECHNICAL FIELD

This application relates generally to systems and methods for identifying and addressing cyberattacks and, in some embodiments, to systems and methods for identifying and addressing cyberattacks based on analyzing network traffic over a period of time with a transformer model.

BACKGROUND

Electronic communications between devices can be susceptible to cybersecurity attacks that are difficult to identify. As an example, systems can be implemented to monitor network activity and identify irregularities that are associated with potential attacks, such as rapid and unexpected increases in activity that correspond to credentials being obtained by malicious third parties. However, it can be difficult for these systems to identify attacks in real-time (or close to real-time), particularly when the attacks are configured to mimic non-malicious network activity. This can be done, for example, by distributing malicious network activity over longer periods of time to evade systems monitoring such network activity for sharp increases in activity.

SUMMARY

In view of the above-noted challenges posed in identifying cyberattacks using conventional monitoring techniques, there is a desire for systems and methods that are able to identify network activity that is indicative of a cyberattack in real-time or close to real-time.

The present disclosure addresses the above-identified challenges by identifying network activity associated with, for example, account takeovers where credentials to accounts are obtained using a device controlled by a malicious third party and subsequently used to implement cyberattacks over longer periods of time. For example, systems are described herein that are configured to obtain packets transmitted through a network during a period of time (e.g., 32/64/96+ days) and determine feature values based on the packets (e.g., based on the data represented by the packets such as feature values representing payment transactions associated with a specified merchant). The systems can then determine the probability that at least one of the packets is involved in a cyberattack. As described herein, this probably can be determined using a transformer encoder paired with a detection head trained to identify irregularities indicative of suspicious activity. While the present disclosure is discussed in the context of account takeovers, it will be understood that other scenarios are contemplated, such as scenarios where credentials to accounts are initially obtained by users that are not causing malicious network traffic to be processed to avoid being caught by certain fraud detection systems targeting new accounts, but later do cause such malicious network traffic to be processed. Similarly, the techniques described herein can be implemented to address scenarios such as friendly takeovers (e.g., scenarios where credentials are transferred from a non-malicious party to a malicious third-party), third-parties that are engaged in non-permitted activities (e.g. money laundering) regardless of whether they are aware of unaware of the non-permitted activates, and/or the like.

By implementing the systems and methods described herein, malicious network traffic generated as a result of account takeovers can be more quickly identified and isolated, reducing the overall effect of such account takeovers. This can, in turn, maintain system stability and reliability by preventing attackers from causing damage to a system (e.g., by causing the system to process one or more fraudulent payment transactions, by changing or erasing data in the system, and/or the like). Further, the ability of the malicious third party to obtain sensitive data can also be severely curtailed or prevented altogether.

In an embodiment, a method includes obtaining, by at least one processor, a first plurality of data packets transmitted over a network during at least one period of time, the first plurality of data packets transmitted by at least a first system; determining, by the at least one processor, a plurality of feature values based on the plurality of data packets, each feature corresponding to execution of a protocol by the first system; generating, by the at least one processor, an embedding based on the plurality of feature values and an encoder, the encoder configured to generate embeddings based on pluralities of feature values, the embeddings corresponding to a period of time; determining, by the at least one processor, that at least one data packet of the plurality of data packets is involved in a cyberattack based on the embedding; and causing, by the at least one processor, an execution of a remedial protocol in association with the first system.

In examples, the first plurality of data packets can include at least one second data packet and at least one third data packet, the second data packet corresponding to a first interval and the at least one third data packet corresponding to a second interval that is at least in part earlier than the first interval. Determining the plurality of feature values based on the plurality of packets can include determining the plurality of feature values based on the at least one second data packet and the at least one third data packet.

In some examples, the encoder can include a transformer encoder. Generating the embedding based on the plurality of feature values and the transformer encoder can include providing, by the at least one processor, the plurality of feature values to be input to the transformer encoder and cause the transformer encoder to generate an output, and obtaining, by the at least one processor, the embedding based on the generation of the output of the transformer encoder.

In examples, determining that the at least one data packet of the plurality of data packets is involved in a cyberattack can include providing, by the at least one processor, the embedding to be input to a prediction head and cause the prediction head to generate an output, and obtaining, by the at least one processor, data associated with a probability that the at least one data packet of the plurality of data packets is involved in a cyberattack based on the generation of the output of the prediction head.

In examples, determining that the at least one data packet of the plurality of data packets is involved in a cyberattack can include comparing, by the at least one processor, the probability that the at least one data packet of the plurality of data packets is involved in a cyberattack with a threshold probability; determining, by the at least one processor, that the probability satisfies the threshold probability; and determining that the at least one data packet of the plurality of data packets is involved in a cyberattack based on determining that the probability satisfies the threshold probability.

In some examples, determining the plurality of feature values based on the plurality of data packets can include determining, by the at least one processor, that one or more dependencies involved in generating at least one feature value is not satisfied; and determining, by the at least one processor, an alternative feature value based on one or more of: a default feature value or one or more different feature values. In various examples, determining the plurality of feature values based on the plurality of data packets can include determining, by the at least one processor and for the at least one period of time, at least one of: a minimum feature value, an average feature value, a maximum feature value, a minimum aggregate feature value, a mean aggregate feature value, or a maximum aggregate feature value. In examples, the method can include determining, by the at least one processor, the plurality of feature values based on at least one of the minimum feature value, the average feature value, the maximum feature value, the minimum aggregate feature value, the mean aggregate feature value, or the maximum aggregate feature value.

In another embodiment, a system includes one or more processors. The one or more processors can be configured to: obtain a first plurality of data packets transmitted over a network during at least one period of time, the first plurality of data packets transmitted by at least a first system; determine a plurality of feature values based on the plurality of data packets, each feature corresponding to execution of a protocol by the first system; generate an embedding based on the plurality of feature values and an encoder, the encoder configured to generate embeddings based on pluralities of feature values, the embeddings corresponding to a period of time; determine that at least one data packet of the plurality of data packets is involved in a cyberattack based on the embedding; and cause an execution of a remedial protocol in association with the first system.

In examples, the first plurality of data packets can include: at least one second data packet and at least one third data packet, the second data packet corresponding to a first interval and the at least one third data packet corresponding to a second interval that is at least in part earlier than the first interval. The one or more processors can be configured to determine the plurality of feature values based on the plurality of packets are configured to: determine the plurality of feature values based on the at least one second data packet and the at least one third data packet.

In some examples, the encoder is a transformer encoder, and the one or more processors configured to generate the embedding based on the plurality of feature values and the transformer encoder can be configured to: provide the plurality of feature values to be input to the transformer encoder to cause the transformer encoder to generate an output, and obtain the embedding based on the generation of the output of the transformer encoder.

In examples, the one or more processors configured to determine that the at least one data packet of the plurality of data packets is involved in a cyberattack can be configured to: provide the embedding to be input to a prediction head and cause the prediction head to generate an output, and obtain data associated with a probability that the at least one data packet of the plurality of data packets is involved in a cyberattack based on the generation of the output of the prediction head.

In some examples, the one or more processors configured to determine that the at least one data packet of the plurality of data packets is involved in a cyberattack can be configured to compare the probability that the at least one data packet of the plurality of data packets is involved in a cyberattack with a threshold probability; determine that the probability satisfies the threshold probability; and determine that the at least one data packet of the plurality of data packets is involved in a cyberattack based on determining that the probability satisfies the threshold probability.

In examples, the one or more processors configured to determine the plurality of feature values based on the plurality of data packets can be configured to: determine that one or more dependencies involved in generating at least one feature value is not satisfied; and determine an alternative feature value based on one or more of: a default feature value or one or more different feature values.

In some examples, the one or more processors configured to determine the plurality of feature values based on the plurality of data packets can be configured to: determine, for the at least one period of time, at least one of: a minimum feature value, an average feature value, a maximum feature value, a minimum aggregate feature value, a mean aggregate feature value, or a maximum aggregate feature value. In examples, the one or more processors can determine the plurality of feature values based on at least one of the minimum feature value, the average feature value, the maximum feature value, the minimum aggregate feature value, the mean aggregate feature value, or the maximum aggregate feature value.

In yet another embodiment, a non-transitory computer-readable medium stores instructions thereon that, when executed by one or more processors, cause the one or more processors to: obtain a first plurality of data packets transmitted over a network during at least one period of time, the first plurality of data packets transmitted by at least a first system; determine a plurality of feature values based on the plurality of data packets, each feature corresponding to execution of a protocol by the first system; generate an embedding based on the plurality of feature values and an encoder, the encoder configured to generate embeddings based on pluralities of feature values, the embeddings corresponding to a period of time; determine that at least one data packet of the plurality of data packets is involved in a cyberattack based on the embedding; and cause an execution of a remedial protocol in association with the first system.

In examples, the first plurality of data packets include: at least one second data packet and at least one third data packet, the second data packet corresponding to a first interval and the at least one third data packet corresponding to a second interval that is at least in part earlier than the first interval. The instructions that cause the one or more processors to determine the plurality of feature values based on the plurality of packets can cause the one or more processors to: determine the plurality of feature values based on the at least one second data packet and the at least one third data packet.

In some examples, the encoder is a transformer encoder. The instructions that cause the one or more processors to generate the embedding based on the plurality of feature values and the transformer encoder can cause the one or more processors to: provide the plurality of feature values to be input to the transformer encoder and cause the transformer encoder to generate an output, and obtain the embedding based on the generation of the output of the transformer encoder.

In examples, the instructions that cause the one or more processors to determine that the at least one data packet of the plurality of data packets is involved in a cyberattack can cause the one or more processors to: provide the embedding to be input to a prediction head and cause the prediction head to generate an output, and obtain data associated with a probability that the at least one data packet of the plurality of data packets is involved in a cyberattack based on the generation of the output of the prediction head.

In some examples, the instructions that cause the one or more processors determine that the at least one data packet of the plurality of data packets is involved in a cyberattack can cause the one or more processors to: compare the probability that the at least one data packet of the plurality of data packets is involved in a cyberattack with a threshold probability; determine that the probability satisfies the threshold probability; and determine that the at least one data packet of the plurality of data packets is involved in a cyberattack based on determining that the probability satisfies the threshold probability.

In examples, the instructions that cause the one or more processors determine the plurality of feature values based on the plurality of data packets can cause the one or more processors to: determine that one or more dependencies involved in generating at least one feature value is not satisfied; and determine an alternative feature value based on one or more of: a default feature value or one or more different feature values.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

FIG. 4 is an example model architecture for identifying and addressing cyberattacks by analyzing network traffic over a period of time, according to embodiments.

DETAILED DESCRIPTION

Figure 1:
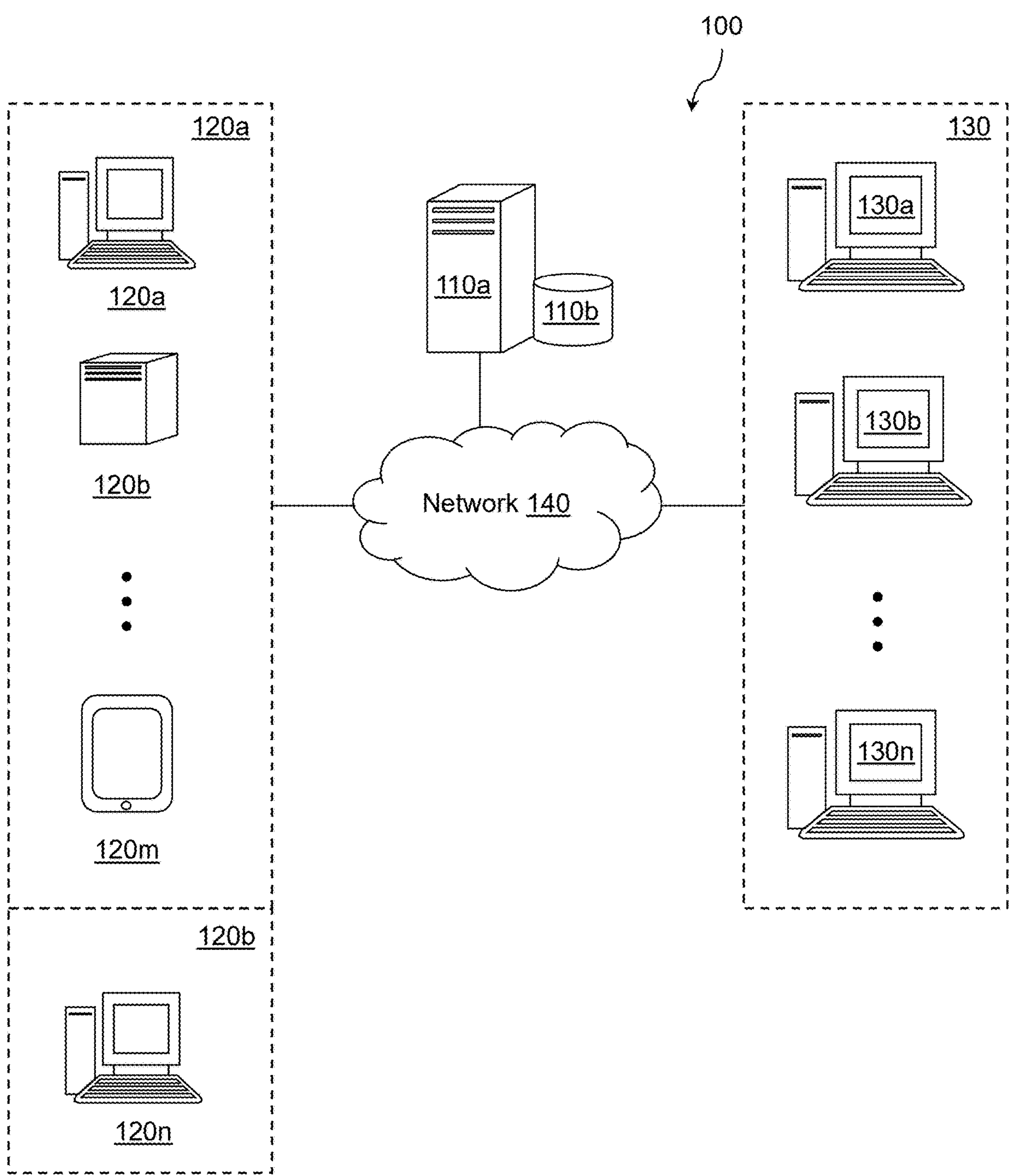
FIG. 1 illustrates various components of an example environment including systems for identifying and addressing cyberattacks, according to embodiments.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure, are to be considered within the scope of the subject matter disclosed herein. Other embodiments can be used and/or other changes can be made without departing from the spirit or scope of the present disclosure. The illustrative embodiments described in the detailed description are not meant to be limiting of the subject matter presented.

FIG. 1 is a non-limiting example of an environment 100 for identifying and addressing cyberattacks based on analyzing network traffic over a period of time. The environment 100 includes an analytics server 110*a*, end-user devices 120*a*-120*n*, service provider devices 130*a*-130*n*, and a network 140. The analytics server 110*a* can implement features described herein to obtain data associated with communication between the end user devices 120*a*-120*n* and the service provider devices 130*a*-130*n*, analyze the data, and identify subsets of the data (e.g., individual messages or groups of messages) indicative of cyberattacks. The analytics server 110*a* can be communicatively coupled to a system database 110*b*, end-user devices 120*a*-*n* (collectively end-user devices 120), and service provider devices 130*a*-130*n* (collectively service provider devices 130). It will be understood that the environment 100 is not confined to the components described herein and can include additional or other components not shown for brevity, which are to be considered within the scope of the embodiments described herein.

The above-mentioned components can be connected to each other through a network 140. Examples of the network 140 can include, but are not limited to, a private or public LAN, WLAN, MAN, WAN, and the Internet. The network 140 can include both wired and wireless communications according to one or more standards and/or via one or more transport mediums. Communication over the network 140 can be performed in accordance with various communication protocols such as Transmission Control Protocol and Internet Protocol (TCP/IP), User Datagram Protocol (UDP), and IEEE communication protocols. In one example, the network 140 can include wireless communications according to Bluetooth specification sets or another standard or proprietary wireless communication protocol. In another example, the network 140 can also include communications over a cellular network, including, e.g., a GSM (Global System for Mobile Communications), CDMA (Code Division Multiple Access), and/or EDGE (Enhanced Data for Global Evolution) network.

The analytics server 110*a* can generate and display an electronic platform via a graphical user interface (GUI). The electronic platform can be configured to receive input associated with the configuration of the analytics server 110*a*. The electronic platform can include one or more GUIs displayed on one or more of the service provider devices 130. An example of the platform generated and hosted by the analytics server 110*a* can be a web-based application or a website configured to be displayed on various computing devices, such as mobile devices, tablets, personal computers, and the like. The platform can include various input elements configured to receive a request and data to be verified. For instance, an end-user can access the platform to upload a file, document, or other user input to be verified (e.g., when executing additional security protocols and/or the like).

The analytics server 110*a* can be any computing device comprising a processor and non-transitory, machine-readable storage capable of executing the various tasks and processes described herein. The analytics server 110*a* can employ various processors, such as a central processing unit (CPU) and graphics processing unit (GPU), among others. Non-limiting examples of such computing devices can include workstation computers, laptop computers, server computers, and the like. In some embodiments, the analytics server 110*a* can be included and/or implemented by one or more of the service provider devices 130. In some embodiments, the analytics server 110*a* can be associated with a service provider that processes network traffic involved in one or more payment transactions (also referred to generally as "transactions").

The analytics server 110*a* can use one or more application programming interfaces (APIs) to communicate with one or more of the computing devices described herein. For instance, the analytics server 110*a* can utilize one or more APIs to automatically transmit/receive data to/from the service providers 130 to enable the analytics server 110*a* to monitor network traffic in accordance with the techniques described herein. In this instance, the API can be associated with (e.g., hosted by) the analytics server 110*a* and configured to transmit the data to the analytics server 110*a*.

End-user devices 120 can represent any computing device comprising a processor and a non-transitory, machine-readable storage medium capable of performing the various tasks and processes described herein. Non-limiting examples of an end-user device 120 include workstation computers, laptop computers, phones, tablet computers, server computers, virtual machines hosted by a computing device, and/or the like. During operation, various users (e.g., customers, individuals associated with issuing banks, merchants, individuals associated with acquiring banks, and/or the like) can use end-user devices 120 to access the platform operationally managed by the analytics server 110*a*. In some embodiments, the end-user devices 120 can be operated by one or more types of end-users. For example, the end-user devices 120 can be operated by individuals, groups of individuals (e.g., employees), and/or the like involved in one or more transactions. In examples, the end-user devices can include an end-user device 120*n* that is controlled by and/or used by individuals such as malicious parties attempting to initiate cybersecurity attacks (cyberattacks). As an example, an end-user device 120 can be used by a malicious party to obtain credentials associated with accounts created and/or associated with other end-user devices 120*a*-120*m*.

Service provider devices 130 can include one or more computing devices comprising a processor and non-transitory, machine-readable storage capable of executing various tasks and processes. The service provider devices 130 can also comprise computing devices such as, for example, servers managing, hosting, or otherwise involved in the operation of a database. For ease of description, FIG. 1 refers to all the components depicted as service providers 130. In some embodiments, the service providers 130 are associated with a financial services provider that can offer payment processing services that are processed at least in part by one or more of the computing devices of the environment 100 of FIG. 1.

As described herein, the analytics server 110*a* can implement various methods to analyze network traffic involving one or more end-user devices 120 and one or more service provider devices 130. For example, the analytics server 110*a* can identify and/or obtain one or more messages transmitted from the end-user devices 120 to one or more of the service provider devices 130. The analytics server 110*a* can then determine whether the one or more messages transmitted by the end-user devices 120 are transmitted in association with an account is compromised. In some embodiments, when the analytics server 110*a* determines that the one or more messages transmitted by the end-user devices 120 are transmitted in association with an account that is compromised, the analytics server 110*a* can cause at least one remedial protocol to be performed as described herein.

In some embodiments, as the analytics server 110*a* determines one or more accounts are involved in, or potentially involved in, a cyberattack, the analytics server 110*a* can cause at least one remedial protocol to be performed. Non-limiting examples of remedial protocols can include suspending transmission, receipt, and/or processing of messages associated with the account. In this way, the analytics server 110*a* can address cyberattacks involving the use of compromised accounts and reduce the effects of such an attack on the service provider devices 130.

Figure 2:
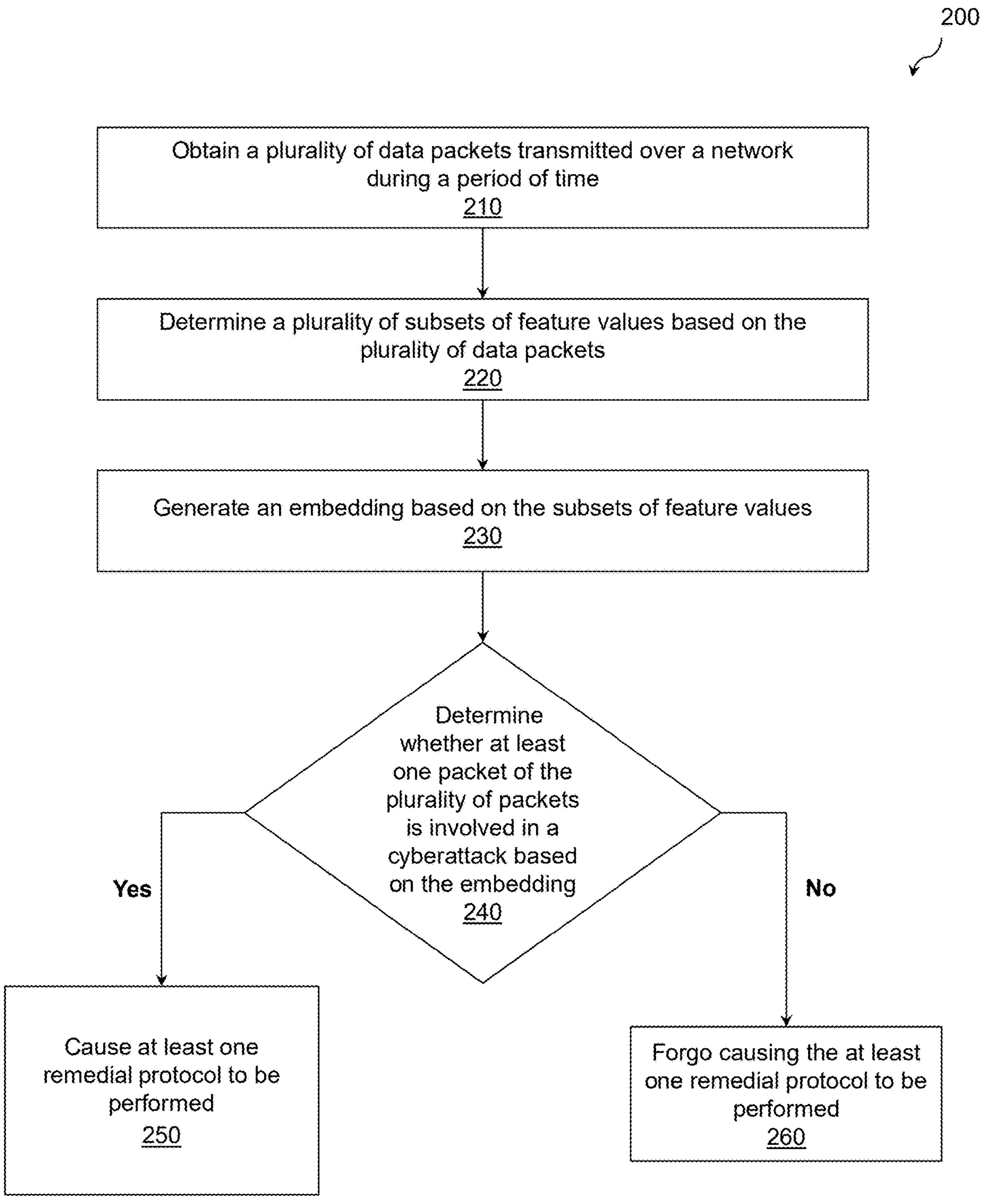
FIG. 2 illustrates a flow diagram of a process executed by an analytics server to identify and address cyberattacks, according to embodiments.

FIG. 2 illustrates a flow diagram of a process 200 executed by an analytics server. The process 200 includes operations 210-260. However, other embodiments can include additional or alternative operations or omit one or more operations altogether. The process 200 is described as being executed by an analytics server that is the same as, or similar to, the analytics server 110*a* described in FIG. 1. However, one or more operations of process 200 can be executed by any number of computing devices operating in the distributed computing system described in FIG. 1. For instance, one or more computing devices (e.g., computing devices that can be the same as, or similar to, the end user devices 120 and/or the service provider devices 130) can perform some or all of the operations described in FIG. 2 alone or in cooperation with one or more other computing devices of FIG. 1. Using the methods and systems described herein, such as the process 200, the analytics server can identify cyberattacks and address such cyberattacks in a manner that reduces or eliminates the effects of the remedial protocols on network traffic not involved in the cyberattacks.

At operation 210, the analytics server obtains a plurality of data packets transmitted over a network, where the plurality of data packets are transmitted during a period of time. For example, the analytics server can obtain the plurality of data packets based on the transmission of the data packets by one or more corresponding end-user devices. In this example, the analytics server can obtain the plurality of data packets at one or more points in time during the period of time. For example, the analytics server can obtain the plurality of data packets from a database storing the data packets (e.g., a database associated with a service provider device) at a single point in time (e.g., based on a request for analysis of the data packets by a service provider device). In another example, the analytics server can obtain the plurality of data packets as they are transmitted to one or more corresponding service provider devices. In this way, the analytics server can obtain the plurality of data packets intermittently, in batches, and/or continuously.

In some embodiments, the plurality of data packets can be associated with one or more transactions. For example, the plurality of data packets can be associated with one or more transactions that involve (e.g., are initiated by) accounts corresponding to users. The accounts can be created by users operating one or more end-user devices or one or more service provider devices. As described herein, some of the data packets can be associated with one or more transactions that involve compromised accounts. For example, a malicious party controlling an end-user device can use the corresponding end-user device to obtain credentials associated with one or more accounts. These credentials can correspond to one or more accounts associated with users such as merchants (also referred to as "merchant accounts") and can be obtained through one or more of a data breach, a brute-force attack, a social-engineering-based attack, a man-in-the-middle attack, and/or the like. While the present disclosure is discussed with respect to users who are merchants, it will be understood that the present disclosure is not limited to such users and that any account that is involved in transactions (e.g., where data is exchanged in association with the account) is contemplated.

In some embodiments, the credentials can correspond to merchant accounts that are infrequently involved in one or more transactions as compared to one or more other merchant accounts. For example, the credentials can correspond to accounts that are dormant (e.g., have not been involved in one or more transactions for a period of time, such as one or more weeks, months, or years). In other examples, the credentials can correspond to accounts that are involved in fewer transactions than other accounts (e.g., other accounts associated with the same merchant or different merchants). As will be appreciated, the credentials can be obtained by malicious third parties and used by the malicious third parties for a period of time without such use being detected by the account owner or service provider device.

At operation 220, the analytics server determines a plurality of subsets of feature values based on the plurality of data packets. For example, the analytics server can process the plurality of data packets to determine subsets of feature values based on the plurality of data packets. In this example, the subsets of feature values can correspond to aspects of the plurality of transactions for sub-periods (e.g., days) represented by the data packets. In an example, subsets of feature values can include (e.g., represent) one or more of a specific payment channel involved in one or more of the transactions, a payment type specifying one or more service providers involved in one or more of the transactions, fee amounts involved in one or more of the transactions, deposit amounts involved in one or more of the transactions, indications of whether bank accounts involved in one or more of the transactions are valid or not valid, a number of disputes involved in one or more of the transactions, a number of refunds involved in one or more of the transactions, a number of chargebacks involved in one or more of the transactions, and/or the like. In these examples, the subsets of feature values can represent activity (e.g., daily, weekly, monthly, and/or the like) associated with respective merchant accounts where the activity further represents multiple transactions that involve the merchant and one or more users (e.g., customers or malicious third-parties).

In some embodiments, the analytics server can determine one or more of the feature values based on analyzing the aspects of the transactions. For example, the analytics server can determine one or more of the feature values based on identifying one or more of a minimum, maximum, and/or average of the values representing an aspect of the transactions, an aggregate of minimum, maximum, and/or average of the values representing an aspect of the transactions, and/or the like. In some embodiments, the analytics server can then determine one or more of the feature values based on one or more of the minimum, maximum, and/or average of the values representing an aspect of the transactions, aggregates of minimum, maximum, and/or average of the values representing an aspect of the transactions, and/or the like. The feature values can be determined on a daily, weekly, monthly, and/or the like basis. In some embodiments, the one or more feature values can be associated with one or more dependencies. For example, the one or more feature values can be associated with the presence or non-presence of one or more aspects of one or more transactions. In this example, the one or more aspects that are used by the analytics server to determine the one or more feature values can correspond to (e.g., represent) dependencies of the feature values determined by the analytics server.

In some embodiments, the analytics server can determine the one or more of the feature values based on a period of time. For example, the analytics server can determine the one or more of the feature values based on a first period of time (e.g., a period of 32 days 64 days, 96 days, and/or the like). In some examples, the analytics server can determine one or more updates to the one or more feature values. For example, the analytics server can determine the one or more updates to the one or more feature values based on a change in the first period of time. As an example, the analytics server can receive the data packets during the first period of time (e.g., during a first slice) and receive additional data packets (e.g., at a point in time after the first period of time corresponding to a second slice). In this example, the analytics server can update the data packets based on receiving the additional data packets by discarding data packets received at the beginning of the first period of time (e.g., received on a first day during the first period of time) and adding the additional packets to the set of packets being analyzed by the analytics server. In this way, the analytics server can periodically update data packets and the period of time during which the analysis described herein occurs.

In some embodiments, the analytics server can store the data packets associated with one or more periods of time to train one or more models. For example, as described above, the analytics server can periodically update the data packets and the period of time during which analysis occurs. In this example, the analytics server can save the data packets for each corresponding period of time (also referred to as a "slice"). The analytics server can then receive input (e.g., via an input device associated with a service provider device) indicating that slices include data packets that are or are not involved in cyberattacks. In some embodiments, where slices are successively identified as being not involved in cyberattacks, and subsequently multiple slices are successively identified as being involved in cyberattacks, the input can indicate an inflection point (also referred to as a "gone bad" point) representing a point in time when the account of a given merchant was compromised.

In some embodiments, the analytics server can preprocess the data packets associated with one or more of the periods of time. For example, the analytics server can preprocess the data packets associated with the one or more periods of time based on the analytics server determining that one or more dependencies are or are not satisfied. As an example, the analytics server can preprocess the data packets and determine that one or more end-user devices are associated with merchants that have not been involved in one or more refunds for one or more days. In this example, the analytics server can preprocess the data packets by updating the data packets to include alternative feature values such as a default feature value, an expected number of refunds, an average refund value, and/or the like on the days where the merchant was not involved in the one or more refunds. In other examples, the analytics server can preprocess the data packets by forward-filling or backward-filling one or more feature values. For example, where the analytics server determines that end-user devices are associated with the merchants that have not been involved in one or more refunds for one or more days, the analytics server can identify one or more days where the merchants were involved in one or more refunds and update the corresponding feature values of prior and/or subsequent days to match the feature values of the days when the refunds were processed. While discussed in the context of refunds, the analytics server can be configured to preprocess the data packets based on any aspect of the data packet contemplated herein.

At operation 230, the analytics server generates an embedding based on the subsets of feature values. For example, the analytics server can generate the embedding based on the subsets of feature values and an encoder. In some embodiments, the analytics server can generate the embedding based on the subsets of feature values and the encoder by providing data associated with the subsets of feature values to the encoder. For example, the analytics server can provide the data associated with the subsets of feature values to the encoder to cause the encoder to provide an output. In this example, the output of the encoder can include data associated with the embedding that is used to determine whether the plurality of data packets are involved in a cyberattack.

As described above, the embedding can correspond to the period of time represented by the feature values. For example, the analytics server can receive data packets representing transactions processed during a period of time, as described above. In this example, the analytics server can provide the data packets corresponding to the period of time to the encoder to cause the encoder to generate the embedding. For examples, the analytics server can receive data packets representing transactions processed during a subsequent period of time (e.g., a subsequent day) and provide data packets corresponding to the subsequent period of time (adding the received data packets and removing corresponding data packets that do not correspond to the subsequent period of time) to the encoder to cause the encoder to generate the data associated with the embedding. In this way, the analytics server can batch one or more data packets for a given interval (e.g., every day, every week, every month, and/or the like) and generate embeddings based on the data packets associated with the batch.

In some embodiments, the analytics server generates the embedding based on the subsets of feature values, the encoder, and a positional encoder. For example, the analytics server can generate the embeddings based on the analytics server providing data associated with the feature values to a positional encoder. The positional encoder can be configured to update the data associated with the feature values based on one or more positional embeddings. For example, the positional encoder can be configured to update the data associated with the feature values by including (e.g., appending) a positional embedding to one or more values corresponding to sets of features. In this example, where the analytics server implements the encoder to analyze account activity for a period of time, including a number of days, the feature values corresponding to the first day of the period of time can be updated with a positional embedding corresponding to the first day, the feature values corresponding to the second day of the period of time can be updated with a positional embedding corresponding to the second day, and so on. The analytics server can then provide the data associated with the subsets of feature values and corresponding positional embeddings to the encoder, as described above, to cause the encoder to generate the embedding.

In some embodiments, the encoder can include a transformer encoder. For example, the encoder can include a transformer encoder that is trained to generate the embedding. In this example, the transformer encoder can be trained to generate the embedding based on one or more sets of feature values representing earlier-processed transactions.

In some embodiments, the transformer encoder can be trained in association with (e.g., while training) a prediction head. For example, a set of feature values associated with the feature values representing the earlier-processed transactions can be provided to the transformer encoder to cause the transformer encoder to generate one or more embeddings. The one or more embeddings can then be provided to the prediction head (e.g., a feed-forward network) to cause the prediction head to output a prediction. The analytics server can then compare the output of the prediction head to a known output (e.g., a tag indicating whether corresponding data packets represented by the feature values are associated with a cyberattack) and update one or more of the weights of the prediction head and/or the transformer encoder. In this way, the analytics server can train the transformer encoder and the prediction head jointly to cooperate and classify subsequent feature values as being associated or not associated with cyberattacks. In some embodiments, the transformer encoder can be trained during the training of a transformer (e.g., an encoder-decoder attention model) that includes the transformer encoder. For example, the analytics server can prepend and append a beginning token and an ending token (respectively) to a set of feature values determined for a period of time (e.g., a period of time before the period of time being analyzed by the analytics server) and/or to corresponding to periods of time (e.g., individual days) within the period of time. As described above, the analytics server can also append a positional encoding to the data associated with the feature values. The analytics server can then provide data associated with the feature values and appended positional encoding to the transformer encoder and transformer decoder of the transformer to train the transformer to generate an output. In some embodiments, during training, the analytics server can mask (e.g., replace with a default or mask value) one or more feature values to cause the transformer to learn replacement values that approximate the masked feature values. In this way, the analytics server can train the transformer, including the transformer encoder, to generate the embeddings described herein.

At operation 240, the analytics server determines whether at least one data packet of the plurality of data packets is involved in a cyberattack based on the embedding. For example, the analytics server can provide the embedding generated by the encoder to a prediction head to cause the prediction head to generate an output. In this example, the prediction head can be trained to generate outputs, including data associated with an indication of whether at least one data packet of the plurality of data packets is involved in a cyberattack. In some embodiments, the prediction head can include a neural network or other similar model and can be trained based on a supervised learning approach where a plurality of embeddings and corresponding tags indicate whether the embeddings (e.g., the data packets represented by the embeddings) are associated with cyberattacks or are not associated with cyberattacks are provided to the neural network. In these embodiments, the detection head can be trained to generate outputs indicating a prediction as to whether or not the embeddings are or are not associated with cyberattacks.

For example, the indication can be represented as a binary value (e.g., 0 or 1) indicating that at least one data packet is or is not involved in the cyberattack. In other examples, the indication can be represented as a probability (e.g., a value between 0 and 1) corresponding to a likelihood as to whether the at least one data packet is involved in a cyberattack. In some embodiments, the analytics server can then determine that the at least one data packet of the plurality of data packets is involved in the cyberattack based on the indication of whether the at least one data packet is involved in the cyberattack. For example, where the plurality of data packets are associated with a single organization (e.g., a single merchant), the analytics server can determine that the account of the organization is compromised based on the indication output by the detection head. Additionally, or alternatively, where the plurality of data packets are associated with multiple organizations (e.g., a group of merchants), the analytics server can determine that at least one account of the group of accounts corresponding to the group of merchants is compromised based on the indication output by the detection head.

In some embodiments, the analytics server can determine that at least one data packet is involved in a cyberattack based on a comparison of the indication output by the detection head to a threshold probability or range of probabilities. For example, the analytics server can receive input indicating a threshold probability that corresponds to an inflection point between indications associated with a cyberattack and indications that are not associated with a cyberattack. The input can be provided by a user via an input device associated with one or more service provider devices. The analytics server can then compare the indication to the threshold probability. Where the indication satisfies the threshold probability or range of probabilities, the analytics server can determine that at least one data packet is involved in a cyberattack. Alternatively, where the indication does not satisfy the threshold probability or range of probabilities, the analytics server can determine that the at least one data packet is not involved in a cyberattack.

At operation 250 ("Yes" at block 240), the analytics server can cause at least one remedial protocol to be performed. For example, the analytics server can cause at least one remedial action to be performed by providing an indication to one or more service provider systems that one or more accounts are compromised. In this example, the one or more service provider systems can be configured to suspend activity (e.g., forgo processing one or more transactions) associated with one or more accounts identified by the analytics server based on the indication provided by the analytics server. In examples, the service provider system can be configured to reset the credentials corresponding to the one or more accounts based on the indication provided by the analytics server.

In some embodiments, the analytics server can cause a remedial protocol to be performed by providing a representation of one or more of the data packets for display via a display device of a service provider device. For example, the analytics server can generate a graphical user interface (GUI) representing aspects of the one or more data packets. The analytics server can then provide data associated with the GUI to a corresponding service provider device (e.g., a service provider device involved in one or more transactions represented by the one or more data packets) to cause the display device of the service provider device to display the GUI. In this example, a user can review and provide input indicating whether to cause the remedial protocol to be performed. In cases where the input at the service provider device includes an indication to cause the remedial protocol to be performed, the service provider device can provide data associated with the indication to the analytics server, causing the analytics server to initiate the remedial protocol. Alternatively, where the input at the service provider device does not include an indication to cause the remedial protocol to be performed, the service provider device can provide data associated with the indication to the analytics server, causing the analytics server to forgo initiating the remedial protocol.

In some embodiments, the analytics server can cause a remedial protocol to be performed, where the remedial protocol includes suspending the ability of a service provider system (e.g., a merchant's system) to withdraw funds from an account associated with the merchant. In embodiments, the analytics server can cause a remedial protocol to be performed, where the remedial protocol includes requiring a service provider to associate one or more accounts with the service provider system and enable the analytics server to analyze the one or more accounts to determine whether sufficient funds are available to process one or more transactions represented by the data packets. In some embodiments, the analytics server can cause a remedial protocol to be performed, where the remedial protocol includes initiating a two-step verification involving the service provider system.

At operation 260 ("No" at block 240), the analytics server can forgo, causing at least one remedial protocol to be performed. For example, the analytics server can forgo causing at least one remedial action to be performed by not providing an indication to one or more service provider systems that one or more accounts are compromised. In this example, the service provider system can be configured to continue to permit activity (e.g., processing one or more transactions) associated with the one or more accounts identified by the analytics server. In examples, the service provider system can be configured to forgo causing a reset of the credentials corresponding to the one or more accounts.

Figure 3A:
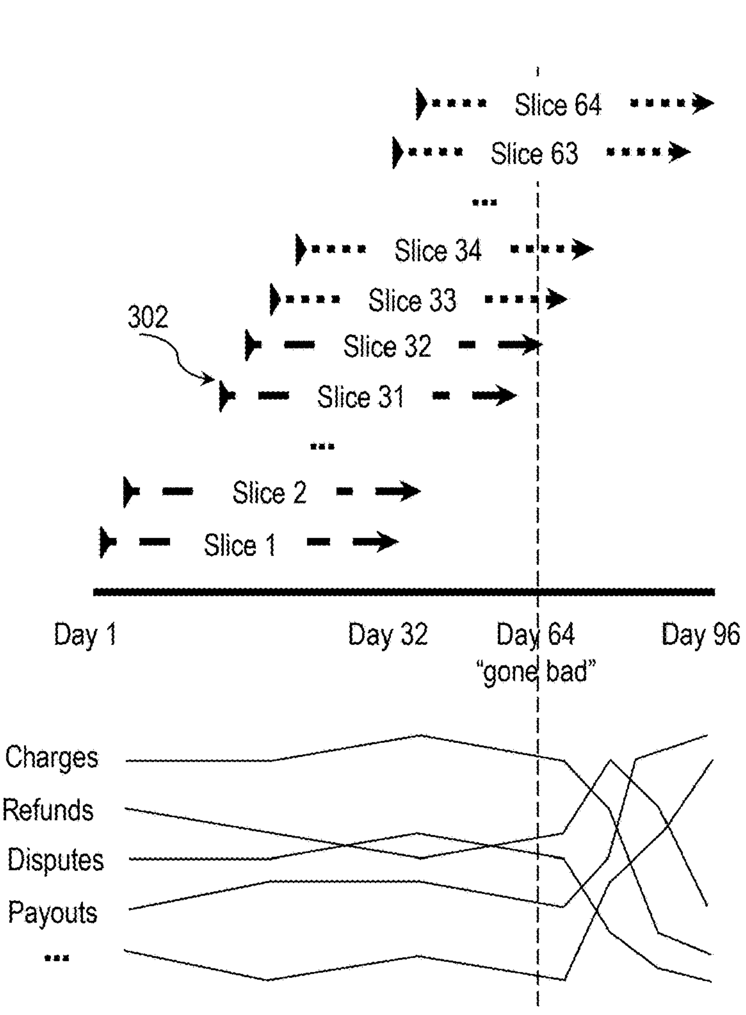
FIGS. 3A-3B are diagrams of an implementation of systems and methods involved in identifying and addressing cyberattacks by analyzing network traffic over a period of time, according to embodiments.
Figure 3B:
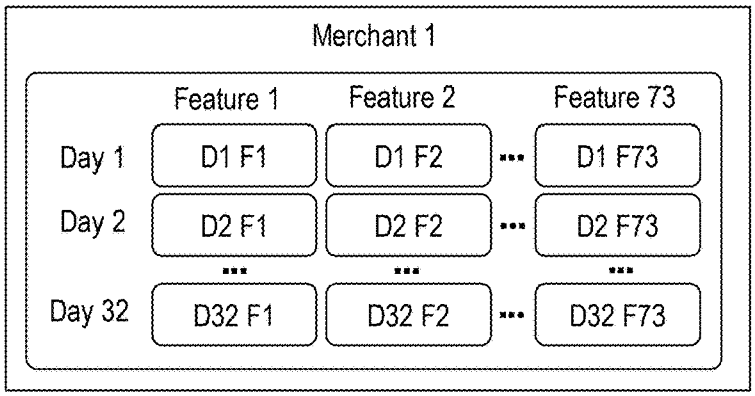

FIGS. 3A and 3B illustrate representations of data 300*a*, 300*b* that can be analyzed by a computing device to determine whether at least one data packet of a plurality of data packets is involved in a cyberattack. It will be understood that other embodiments can include additional or alternative representations of data or can omit some or all of the aspects of the data illustrated altogether. In some embodiments, the data represented by FIGS. 3A and 3B can be analyzed by one or more analytics servers that are the same as, or similar to, the analytics server 110*a* described in FIG. 1.

As illustrated by FIG. 3A, data packets representing transactions can be grouped into individual groupings 302 based on multiple periods of time. For example, the transactions can be grouped into 64 different groupings, 302 corresponding to successive periods of time, each period extending from a first day to a day that is 32 days later (also referred to as "slices"). Each grouping 302 can correspond to a plurality of transactions processed during a period of time. For example, a first grouping 302 ("Slice 1") can correspond to transactions processed during days 1-32, a second grouping 302 ("Slice 2") can correspond to transactions processed during days 2-33, and so on.

As shown by FIG. 3A, the slices can be associated with date on which one or more transactions represented by the data of a grouping 302 indicates a malicious third-party initiated the transaction using a compromised account (also referred to as a "gone bad" date). For example, at day 64, one or more transactions represented by data packets included in a grouping 302 ("Slice 33") can be identified as being associated with a cyberattack. In this example, an analytics server (e.g., an analytics server that is the same as, or similar to, the analytics server 110*a* of FIG. 1 can determine that one or more transactions associated with the grouping 302 (e.g., one or more attributes of the transactions associated with the Slice 33) are initiated by a malicious third-party and associated with a cyberattack. In this example, an analytics server can tag each subsequent slice as being indicative of a cyberattack. In this example, the analytics server can determine that one or more charges, refunds, disputes, or payouts associated with a user (e.g., a merchant) varied, with the variation representing an increased probability that a corresponding account was involved in a cyberattack starting on day 64.

As shown by FIG. 3B, feature values can be determined (e.g., calculated) for a given user (e.g., a specific merchant) for each day of a plurality of days (shown as 32 days). For example, an analytics server can calculate feature values for a set of features corresponding to attributes of one or more transactions. In this example, the analytics server can calculate the feature values as described herein with respect to FIG. 2 for each of 32 days. The feature values can be calculated based on periods of time corresponding to each day. For example, the feature values calculated for Day 1 can be calculated based on data packets representing transactions for the 32 days immediately prior to Day 1, and the feature values calculated for Day 2 can be calculated based on data packets representing transactions for the 32 days immediately prior to Day 2 (including the data packets received on Day 1) and so on. In this way, an analytics server can calculate a set of feature values for multiple periods of time that correspond to one or more successive days. The analytics server can then analyze the feature values as described herein.

FIG. 4 illustrates an example model architecture 400 for identifying and addressing cyberattacks by analyzing network traffic over a period of time. It will be understood that other embodiments can include additional or alternative model architectures and/or model components or can omit some or all of the aspects of the model architecture 400 illustrated altogether. In some embodiments, the model architecture 400 represented by FIG. 4 can be implemented by one or more analytics servers that are the same as, or similar to, the analytics server 110*a* described in FIG. 1 to analyze feature values representing data packets as illustrated in FIG. 3B.

In some embodiments, the model architecture 400 can include inputs 402, a model pipeline 404, and outputs 406. The inputs 402 can be provided by an analytics server to the model pipeline 404 to cause the model pipeline 404 to generate the outputs 406. In this example, the analytics server can implement the model pipeline 404. The outputs 406 of the model pipeline 404 can represent probabilities (also referred to as "scores") indicating whether or not one or more users (e.g., Merchant 1, Merchant 2, . . . , Merchant M) are associated with accounts that are compromised (e.g., at least partially controlled by end-user devices that are controlled by malicious third-parties).

In some embodiments, the inputs 402 can be determined (e.g., calculated) for users such as a specific merchants for each day of a plurality of days (shown as 32 days). For example, an analytics server can calculate feature values for a set of features corresponding to attributes of one or more transactions involving the specific merchants. The one or more transactions can be represented by data packets that are processed by service provider devices (e.g., that are the same as, or similar to, service provider devices 130 of FIG. 1) associated with the specific merchants. In some embodiments, the analytics server can then determine the inputs 402 based on the feature values. For example, the analytics server can determine groupings of feature values corresponding to one or more days for each user that are to be provided to the model pipeline 404 to cause the model pipeline to generate the output 406.

In some embodiments, the model pipeline 404 can include a positional encoder 404*a*, a transformer encoder 404*b*, and a prediction head 404*c*. The positional encoder 404*a* can be associated with (e.g., include) a set of positional embeddings. For example, the positional encoder 404*a* can be associated with a set of positional embeddings that are preprocessed (e.g., predetermined) by the analytics server. In some embodiments, the positional encoder 404*a* can be configured to receive data associated with the input to the model pipeline 404 and update (e.g., add) the data associated with the input by appending one or more positional embeddings to one or more portions of the input. In an example, the analytics server can append a first positional encoding to a first feature value, a second positional encoding to a second feature value, and so on, for a given set of transactions associated with a given merchant. The analytics server can repeat this process for the input data corresponding to each merchant. In some embodiments, the positional encoder 404*a* can be configured to output the data associated with the input based on (e.g., after) updating the data associated with the input.

The model pipeline 404 can include a transformer encoder 404*b*. In some embodiments, an analytics server implementing the model pipeline 404 can cause the output of the positional encoder 404*a* to be provided to the transformer encoder 404*b*. The transformer encoder 404*b* can be configured to receive the output of the positional encoder 404*a*, including the data associated with the input representing the feature values corresponding to the one or more merchants and process the data associated with the input. For example, the transformer encoder 404*b* can be configured to provide the output of the positional encoder 404*a* to a multi-head attention layer that performs multiple attention calculations in parallel. In some embodiments, the transformer encoder 404*b* can then provide the output of the multi-head attention layer as well as the earlier-received data associated with the input to an Add and Norm layer (referred to as a first Add and Norm layer). The first Add and Norm layer can be configured to receive the output of the multi-head attention layer and the original input to the transformer encoder (provided by the positional encoder 404*a*) to both combine the data associated with the input to the output of the multi-head attention layer to generate an output for the transformer encoder 404*b* and normalize the output for the transformer encoder 404*b*. In some embodiments, the transformer encoder 404*b* can then provide the data output by the first Add and Norm layer to a dense projection layer. The dense projection layer can be configured to receive and perform a linear transformation to the output of the Add and Norm layers. Finally, the transformer encoder 404*b* can provide the output of the dense projection layer as well as the output of the first Add and Layer norm layer to a different Add and Layer norm layer (referred to as a second Add and Norm layer). Similar to the first Add and Layer norm layer, the second Add and Layer norm layer can receive the inputs (the output of the dense projection layer and the output of the first Add and Layer norm layer) to both combine the data associated with the output of the dense projection layer with the output of the first Add and Layer norm layer to generate and normalize the data to be output by the transformer encoder 404*b*. The output of the transformer encoder 404*b* can represent (e.g., include) data associated with an embedding that is associated with an encoded representation of the input to the transformer encoder 404*b*.

In some embodiments, the model pipeline 404 can include a prediction head 404*c*. The prediction head 404*c* can include a neural network or other similar model and can be trained based on a supervised learning approach as described with respect to FIG. 2. For example, the detection head can be trained generate outputs indicating a prediction as to whether or not the embeddings are or are not associated with cyberattacks. The prediction can be represented as a binary value or a percentage corresponding to a probability that one or more transactions represented by the embedding generated by the transformer encoder 404*b* are indicative of a cyberattack.

In some embodiments, the prediction head 404*c* can receive the output of the transformer encoder 404*b*, where the output includes the data associated with the embedding. The prediction head 404*c* can then provide the data to a Global 1-D max pooling layer (also referred to as a max pooling layer). The max pooling layer can be configured to receive and update the data associated with the embedding by reducing the dimension of the embedding. In examples where the prediction head 404*c* includes a feed-forward neural network, the max pooling layer can reduce the number of neurons used to represent the data associated with the embedding. In some embodiments, the max pooling layer can then provide the data associated with the embedding as an output. In some embodiments, the prediction head 404*c* can provide the data associated with the embedding that is output by the max pooling layer to a dropout layer. The dropout layer can be configured to remove one or more neurons associated with the output of the max pooling layer. For example, the dropout layer can be configured to randomly remove the one or more neurons and forward data associated with the remaining neurons as an output of the dropout layer. In some embodiments, the prediction head 404*c* can then provide the data output by the dropout layer to a dense layer. The dense layer can be configured to perform a linear transformation based on the data output by the dropout layer, the linear transformation including multiplying the data input to the dense layer by a weight matrix and adding a bias vector. The prediction head 404*c* can then generate an output 406. In some embodiments, the output 406 can include data associated with a prediction based on the linear transformation, the prediction indicating a probability (score) indicating whether or not one or more users are associated with accounts that are compromised. In some embodiments, the analytics server can then perform or forgo performing one or more remedial protocols based on the output 406 as described with respect to FIG. 2.

Figure 5:
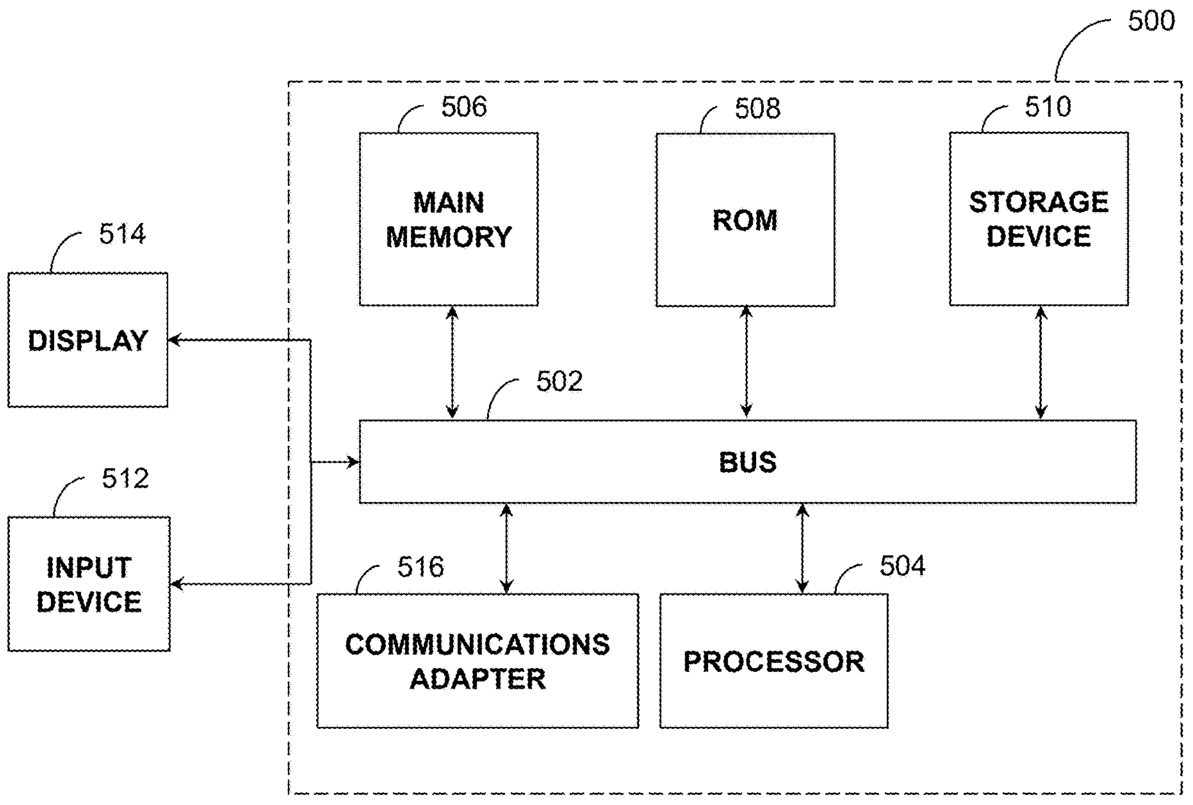
FIG. 5 illustrates a component diagram of a computing system suitable for use in the various implementations described herein, according to embodiments.

FIG. 5 is a component diagram of an example computing system suitable for use in the various implementations described herein, according to an example implementation. One or more steps of the methods and processes discussed herein can be performed by the computing system depicted in FIG. 5.

The computing system 500 includes a bus 502 or other communication component for communicating information and a processor 504 coupled to the bus 502 for processing information. The computing system 500 also includes a main memory 506, such as a RAM or other dynamic storage device, coupled to the bus 502 for storing information and instructions to be executed by the processor 504. Main memory 506 can also be used for storing position information, temporary variables, or other intermediate information during the execution of instructions by the processor 504. The computing system 500 may further include a ROM 508 or other static storage device coupled to the bus 502 for storing static information and instructions for the processor 504. A storage device 510, such as a solid-state device, magnetic disk, or optical disk, is coupled to the bus 502 for persistently storing information and instructions.

The computing system 500 may be coupled via the bus 502 to a display 514, such as a liquid crystal display or active matrix display, for displaying information to a user. An input device 512, such as a keyboard including alphanumeric and other keys, may be coupled to the bus 502 for communicating information, and command selections to the processor 504. In another implementation, the input device 512 has a touch screen display. The input device 512 can include any type of biometric sensor, or a cursor control, such as a mouse, a trackball, or cursor direction keys, for communicating direction information and command selections to the processor 504 and for controlling cursor movement on the display 514.

In some implementations, the computing system 500 may include a communications adapter 516, such as a networking adapter. Communications adapter 516 may be coupled to bus 502 and may be configured to enable communications with a computing or communications network or other computing systems. In various illustrative implementations, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 500 in response to the processor 504 executing an implementation of instructions contained in main memory 506. Such instructions can be read into main memory 506 from another computer-readable medium, such as the storage device 510. Execution of the implementation of instructions contained in main memory 506 causes the computing system 500 to perform the illustrative processes described herein. One or more processors in a multi-processing implementation may also be employed to execute the instructions contained in main memory 506. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUS, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open ended terms. Further, the phrase "based on" is intended to mean "based at least partially on" unless explicitly stated otherwise.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:

obtaining, by at least one processor, a plurality of data packets transmitted over a network corresponding to network operation activity parameters for a first time interval and a second time interval, the plurality of data packets transmitted by at least a first system, wherein the plurality of data packets includes at least one first data packet corresponding to the first time interval and at least one second data packet corresponding to the second time interval;

determining, by the at least one processor, a plurality of feature values from the first time interval and the second time interval based on the plurality of data packets, each feature corresponding to execution of a protocol by the first system;

detecting, by the at least one processor, a change indicative of a potential cyberattack based on the plurality of feature values from the first time interval and the plurality of feature values from the second time interval;

in accordance with a detection of the potential cyberattack, generating, by the at least one processor, an embedding based at least in part on the detected change, the plurality of feature values for a plurality of sub-intervals within the first time interval and the second time interval, and a transformer encoder, wherein a positional embedding is applied to the plurality of feature values according to temporal order and the transformer encoder is configured to generate the embedding based on the plurality of feature values from the first time interval and the plurality of feature values from the second time interval;

determining, by the at least one processor, that at least one data packet of the plurality of data packets is involved in a cyberattack based on the embedding; and in accordance with a determination that the at least one data packet is involved in the cyberattack, causing, by the at least one processor, an execution of a remedial protocol in association with the first system.

2. The method of claim 1, wherein the second time interval is at least in part earlier than the first time interval, and wherein determining the plurality of feature values based on the plurality of data packets comprises:

determining the plurality of feature values based on the at least one first data packet and the at least one second data packet.

3. The method of claim 2, wherein determining that the at least one data packet of the plurality of data packets is involved in the cyberattack comprises:

providing, by the at least one processor, the embedding to be input to a prediction head and cause the prediction head to generate an output, and obtaining, by the at least one processor, data associated with a probability that the at least one data packet of the plurality of data packets is involved in the cyberattack based on the generation of the output of the prediction head.

4. The method of claim 3, wherein determining that the at least one data packet of the plurality of data packets is involved in the cyberattack comprises:

comparing, by the at least one processor, the probability that the at least one data packet of the plurality of data packets is involved in the cyberattack with a threshold probability;

determining, by the at least one processor, that the probability satisfies the threshold probability; and determining that the at least one data packet of the plurality of data packets is involved in the cyberattack based on determining that the probability satisfies the threshold probability.

5. The method of claim 1, wherein determining the plurality of feature values based on the plurality of data packets comprises:

determining, by the at least one processor, that one or more dependencies involved in generating at least one feature value is not satisfied; and determining, by the at least one processor, an alternative feature value based on one or more of: a default feature value or one or more different feature values.

6. The method of claim 1, wherein determining the plurality of feature values based on the plurality of data packets comprises:

determining, by the at least one processor and for the first time interval and the second time interval, at least one of:

a minimum feature value,
an average feature value,
a maximum feature value,
a minimum aggregate feature value,
a mean aggregate feature value, or
a maximum aggregate feature value, and determining, by the at least one processor, the plurality of feature values based on at least one of the minimum feature value, the average feature value, the maximum feature value, the minimum aggregate feature value, the mean aggregate feature value, or the maximum aggregate feature value.

7. A system, comprising:

one or more processors configured to:

obtain a plurality of data packets transmitted over a network corresponding to network operation activity parameters for a first time interval and a second time interval, the plurality of data packets transmitted by at least a first system, wherein the plurality of data packets includes at least one first data packet corresponding to the first time interval and at least one second data packet corresponding to the second time interval;

determine a plurality of feature values from the first time interval and the second time interval based on the plurality of data packets, each feature corresponding to execution of a protocol by the first system;

detect a change indicative of a potential cyberattack based on the plurality of feature values from the first time interval and the plurality of feature values from the second time interval;

in accordance with a detection of the potential cyberattack, generate an embedding based at least in part on the detected change, the plurality of feature values for a plurality of sub-intervals within the first time interval and the second time interval, and a transformer encoder, wherein a positional embedding is applied to the plurality of feature values according to temporal order and the transformer encoder is configured to generate the embedding based on the plurality of feature values from the first time interval and the plurality of feature values from the second time interval;

determine that at least one data packet of the plurality of data packets is involved in a cyberattack based on the embedding; and in accordance with a determination that the at least one data packet is involved in the cyberattack, cause an execution of a remedial protocol in association with the first system.

8. The system of claim 7, wherein the second time interval is at least in part earlier than the first time interval, and wherein the one or more processors configured to determine the plurality of feature values based on the plurality of data packets are configured to:

determine the plurality of feature values based on the at least one first data packet and the at least one second data packet.

9. The system of claim 8, wherein the one or more processors configured to determine that the at least one data packet of the plurality of data packets is involved in the cyberattack are configured to:

provide the embedding to be input to a prediction head and cause the prediction head to generate an output, and obtain data associated with a probability that the at least one data packet of the plurality of data packets is involved in the cyberattack based on the generation of the output of the prediction head.

10. The system of claim 9, wherein the one or more processors configured to determine that the at least one data packet of the plurality of data packets is involved in the cyberattack are configured to:

compare the probability that the at least one data packet of the plurality of data packets is involved in the cyberattack with a threshold probability;

determine that the probability satisfies the threshold probability; and determine that the at least one data packet of the plurality of data packets is involved in the cyberattack based on determining that the probability satisfies the threshold probability.

11. The system of claim 7, wherein the one or more processors configured to determine the plurality of feature values based on the plurality of data packets are configured to:

determine that one or more dependencies involved in generating at least one feature value is not satisfied; and determine an alternative feature value based on one or more of: a default feature value or one or more different feature values.

12. The system of claim 7, wherein the one or more processors configured to determine the plurality of feature values based on the plurality of data packets are configured to:

determine, for the first time interval and the second time interval, at least one of:

a minimum feature value, an average feature value, a maximum feature value, a minimum aggregate feature value, a mean aggregate feature value, or a maximum aggregate feature value, and determine the plurality of feature values based on at least one of the minimum feature value, the average feature value, the maximum feature value, the minimum aggregate feature value, the mean aggregate feature value, or the maximum aggregate feature value.

13. A non-transitory computer-readable medium storing instructions there on that, when executed by one or more processors, cause the one or more processors to:

obtain a plurality of data packets transmitted over a network corresponding to network operation activity parameters for a first time interval and a second time interval, the plurality of data packets transmitted by at least a first system, wherein the plurality of data packets includes at least one first data packet corresponding to the first time interval and at least one second data packet corresponding to the second time interval;

determine a plurality of feature values from the first time interval and the second time interval based on the plurality of data packets, each feature corresponding to execution of a protocol by the first system;

detect a change indicative of a potential cyberattack based on the plurality of feature values from the first time interval and the plurality of feature values from the second time interval;

in accordance with a detection of the potential cyberattack, generate an embedding based at least in part on the detected change, the plurality of feature values for a plurality of sub-intervals within the first time interval and the second time interval, and a transformer encoder, wherein a positional embedding is applied to the plurality of feature values according to temporal order and the transformer encoder is configured to generate the embedding based on the plurality of feature values from the first time interval and the plurality of feature values from the second time interval;

determine that at least one data packet of the plurality of data packets is involved in a cyberattack based on the embedding; and in accordance with a determination that the at least one data packet is involved in the cyberattack, cause an execution of a remedial protocol in association with the first system.

14. The non-transitory computer-readable medium of claim 4, wherein the second time interval is at least in part earlier than the first time interval, and wherein the instructions that cause the one or more processors to determine the plurality of feature values based on the plurality of data packets cause the one or more processors to:

determine the plurality of feature values based on the at least one first data packet and the at least one second data packet.

15. The non-transitory computer-readable medium of claim 14, wherein the instructions that cause the one or more processors to determine that the at least one data packet of the plurality of data packets is involved in the cyberattack cause the one or more processors to:

provide the embedding to be input to a prediction head and cause the prediction head to generate an output, and obtain data associated with a probability that the at least one data packet of the plurality of data packets is involved in the cyberattack based on the generation of the output of the prediction head.

16. The non-transitory computer-readable medium of claim 15, wherein the instructions that cause the one or more processors determine that the at least one data packet of the plurality of data packets is involved in the cyberattack cause the one or more processors to:

compare the probability that the at least one data packet of the plurality of data packets is involved in the cyberattack with a threshold probability;

determine that the probability satisfies the threshold probability; and determine that the at least one data packet of the plurality of data packets is involved in the cyberattack based on determining that the probability satisfies the threshold probability.

17. The non-transitory computer-readable medium of claim 13, wherein the instructions that cause the one or more processors determine the plurality of feature values based on the plurality of data packets cause the one or more processors to:

determine that one or more dependencies involved in generating at least one feature value is not satisfied; and determine an alternative feature value based on one or more of: a default feature value or one or more different feature values.

* * * * *